United States Patent
He et al.

(10) Patent No.: US 11,438,195 B2
(45) Date of Patent: Sep. 6, 2022

(54) RADIO NODE AND METHOD FOR ESTIMATING CHANNELS IN A WIRELESS COMMUNICATION NETWORK

(71) Applicant: Telefonaktiebolaget LM Ericsson (publ), Stockholm (SE)

(72) Inventors: Ning He, Sollentuna (SE); Virgile Garcia, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/979,728

(22) PCT Filed: Mar. 21, 2018

(86) PCT No.: PCT/SE2018/050291
§ 371 (c)(1),
(2) Date: Sep. 10, 2020

(87) PCT Pub. No.: WO2019/182491
PCT Pub. Date: Sep. 26, 2019

(65) Prior Publication Data
US 2021/0044457 A1  Feb. 11, 2021

(51) Int. Cl.
*H04L 25/02* (2006.01)
*H04B 7/06* (2006.01)
*H04W 24/08* (2009.01)

(52) U.S. Cl.
CPC ....... *H04L 25/0204* (2013.01); *H04B 7/0617* (2013.01); *H04L 25/021* (2013.01); *H04W 24/08* (2013.01)

(58) Field of Classification Search
CPC .... H04B 7/0695; H04B 7/088; H04B 7/0617; H04W 16/28; H04W 24/08; H04L 5/006; H04L 25/0204; H04L 25/021
See application file for complete search history.

(56) References Cited

U.S. PATENT DOCUMENTS 9,191,050 B1 * 11/2015 Hwang .................. H04B 1/525
2004/0132496 A1    7/2004 Kim et al.
(Continued)

OTHER PUBLICATIONS

International Search Report dated Jan. 28, 2019 for International Application No. PCT/SE2018/050291 filed on Mar. 21, 2018, consisting of 11-pages.
(Continued)

*Primary Examiner* — Sung S Ahn
(74) *Attorney, Agent, or Firm* — Christopher & Weisberg, P.A.

(57) ABSTRACT

A method performed by a first radio node for estimating channels in a wireless communication network is provided. The first radio node receives a signal from a second radio node in the wireless communication network. The signal has multiple beams.
For each of at least some of the multiple beams the first radio node obtains information about a beam-specific signal quality, adapts (3039 any one or more out of: channel estimation parameters and channel estimation methods related to the beam, based on the beam-specific signal quality, and estimates a channel of the beam using any one or more out of: the adapted channel estimation parameters and the channel estimation methods.

18 Claims, 9 Drawing Sheets

(56) References Cited

U.S. PATENT DOCUMENTS

2009/0239472 A1\*  9/2009  Chae .................... H04B 7/0617
                                                    455/63.1
2016/0226640 A1\*  8/2016  Seol .................... H04B 7/0695
2017/0195027 A1   7/2017  Baek et al.

OTHER PUBLICATIONS

EPO Communication and Search Report dated Sep. 24, 2021 for Patent Application No. 18911051.3, consisting of 8-pages.

\* cited by examiner

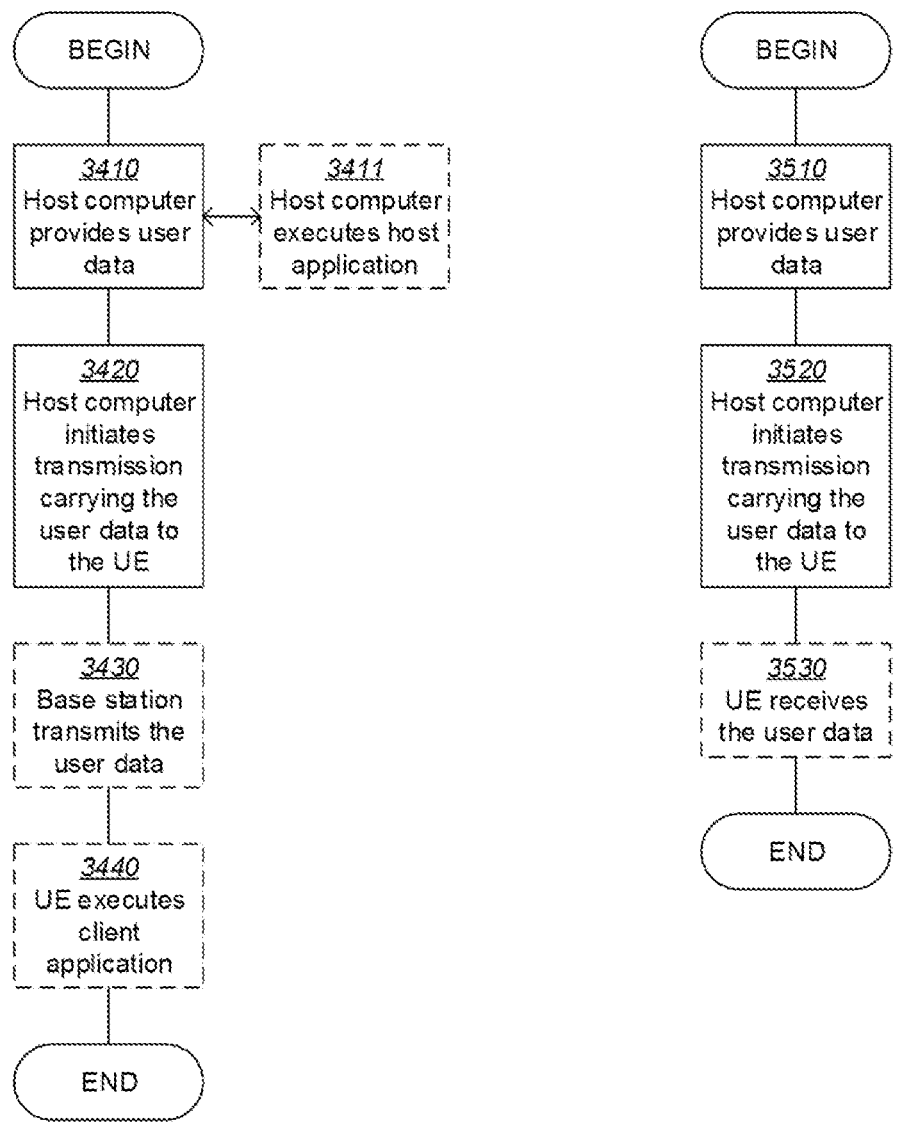

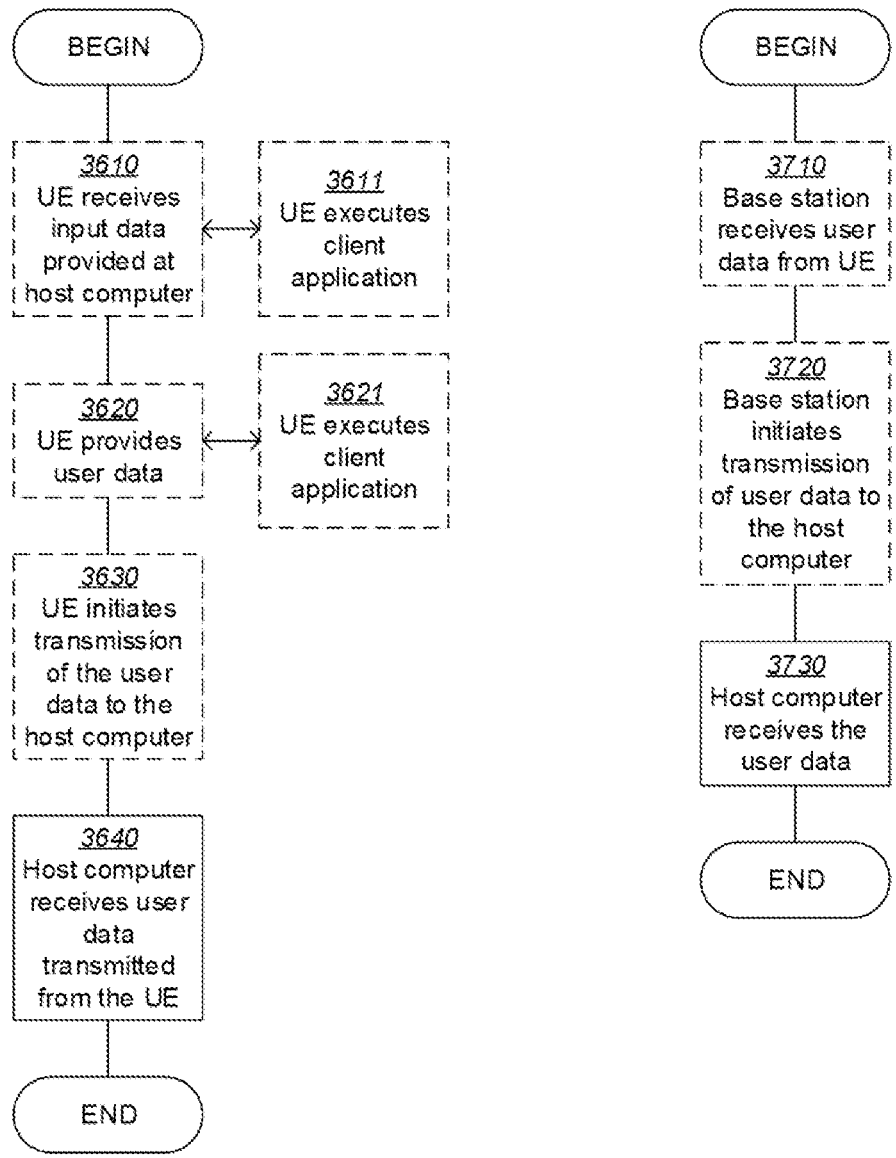

RADIO NODE AND METHOD FOR ESTIMATING CHANNELS IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2018/050291, filed Mar. 21, 2018 entitled "RADIO NODE AND METHOD FOR ESTIMATING CHANNELS IN A WIRELESS COMMUNICATION NETWORK," the entirety of which is incorporated herein by reference.

TECHNICAL FIELD

Embodiments herein relate to a first radio node and methods therein. In particular, they relate to estimating channels in a wireless communication network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL). The wireless devises communicate to each other in SideLink (SL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) and to continuously evolve 4G. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Beam Forming

Multi-antenna systems allow transmitting signals focused towards certain spatial regions. This creates beams also referred to as beam forming, whose coverage distance may reach beyond transmissions using non-beamformed signals but at the cost of narrower coverage. This is a classic trade-off between distance and angular coverage. The same technique may also be applied to multi-user transmission in space while transmitting in the same time and frequency space to increase spectral efficiency without too much interference increase among users. This may also be referred to as multi-user MIMO.

In 5G, radio devices are expected to operate with large number of antennas referred to as Massive MIMO, offering flexibility and potentially very narrow beams, i.e. with very large focusing gain. Massive MIMO makes a clean break with current practice through the use of a very large number of service antennas that are operated fully coherently and adaptively.

Beam Space Transformation

Utilizing multiple antennas at a receiver allows for sampling of a signal over a larger antenna aperture, which increases the overall received power. Further, it allows for coherent combination of multiple copies of the received signal, and hence provides an additional receive beamforming gain in a direction of interest. Since UEs and signals are in general not evenly distributed in space, this may provide a possibility of only processing the signals such as beams which comprises valuable information. Hence, beam space processing with beam selection may provide a complexity reduction.

Channel Estimations

When a signal is sent in a propagation channel, distortion and noise are added to the signal when the signal is transmitted through the channel. To be able to properly decode the received signal without errors, the distortion and noise applied by the channel need to be removed. To do this, the characteristics of the channel is required. The process to characterize the channel is referred to as channel estimation.

The channel estimation procedure includes several steps with different parameters. The channel estimation is traditionally performed on a reference symbol, a pilot signal or training symbols, that are known sequences of information at both Transmission (Tx) and Reception (Rx).

An initial step of the channel estimation is to perform a Match Filter of the received signals with the training sequence, to have a first rough estimate of the channel between the Tx and Rx. Then, various processing algorithms may be applied to improve the estimation, typically some time or frequency-based filtering approach. The goal being to mitigate noise and interference.

Covariance Estimations

Covariance estimation is related to joint statistics of two variables, e.g. X and Y. In signal processing and specifically in a combiner of a receiver of a radio node, one important processing information is the Covariance matrix that comprises the covariance estimation between any two pair of signal input. This matrix is typically used for noise and/or interference rejection e.g. in Minimum Mean Square Error (MMSE) interference suppression.

Channel Estimation Efficiency Signal to Noise Ratio (SNR) Dependent

Estimation of the channel response and the received covariance are techniques that are sensitive to the signal quality. For example, applying a large temporal or frequency-based signal averaging can mitigate noise, and thus be useful at low SNR and/or low Doppler effect, while it will reduce the accuracy achievable at high SNR and/or high Doppler effect.

Thus, using a single parameter and/or algorithm for all received signals imposes a trade-off that is likely not optimal for one or both ends of the signal quality range.

Additionally, a massive MIMO may introduce a much wider working range of SNR per element before beamforming. An extremely low SNR working range are important to extend the cell coverage. With extreme low SNR working range, dedicated parameters are needed to be able to obtain necessary diversity for signal enhancement.

SUMMARY

An object of embodiments herein is to improve the performance of a wireless communications network using multiple beams.

According to a first aspect of embodiments herein, the object is achieved by a method performed by a first radio node for estimating channels in a wireless communication network. The first radio node receives a signal from a second radio node in the wireless communication network. The signal comprises multiple beams.

For each of at least some of the multiple beams the first radio node obtains information about a beam-specific signal quality, adapts any one or more out of: channel estimation parameters and channel estimation methods related to the beam, based on the beam-specific signal quality, and, estimates 304 a channel of the beam using any one or more out of: the adapted channel estimation parameters and the channel estimation methods.

According to a second aspect of embodiments herein, the object is achieved by a first radio node for estimating channels in a wireless communication network. The first radio node is configured to:

Receive a signal from a second radio node in the wireless communication network 100, which signal is adapted to comprise multiple beams.

The first radio node further being configured to, for each of at least some of the multiple beams:

Obtain information about a beam-specific signal quality, adapt any one or more out of: channel estimation parameters and channel estimation methods, related to the beam, based on the beam-specific signal quality, and estimate a channel of the beam using any one or more out of: the adapted channel estimation parameters and the channel estimation methods.

The received signals are beamformed or spatially transformed which means that the signal quality of the beams are not uniformly distributed.

Since the channel estimation parameters and/or channel estimation methods are adapted for each of at least some of the multiple beams based on its beam-specific signal quality, an adaptive estimation for the beams individually can be performed resulting in an overall better signal reception. This in turn improves the performance of a wireless communications network using multiple beams.

An advantage of embodiments herein is that the estimation parameters and methods are optimized on individual beams which may have a large difference in quality after spatial transformation from element space, thus the qualities of the estimations are increased resulting in improved coverage and capacity of the overall system.

BRIEF DESCRIPTION OF THE DRAWINGS

Examples of embodiments herein are described in more detail with reference to attached drawings in which:

FIGS. 8 to 11 are flowcharts illustrating methods implemented in a communication system including a host computer, a base station and a user equipment.

DETAILED DESCRIPTION

As a part of developing embodiments herein the inventors have identified a problem which first will be discussed.

Beam-Space Signal Distribution

Figure 1:
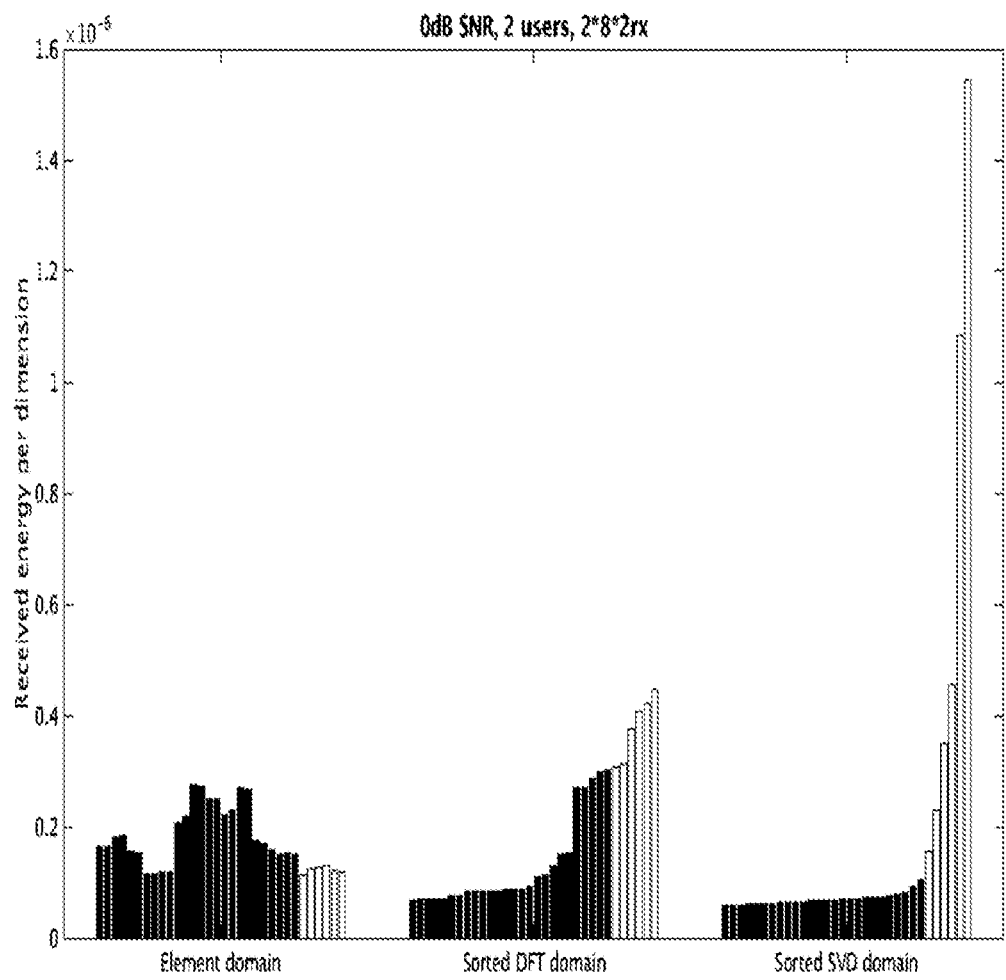
FIG. 1 is a schematic diagram illustrating prior art.

Current base station products in general having a few antennas and without beam space processing, have to consider that the signals are uniformly distributed over the antennas and/or ports. Thus, applying a single set of parameter or algorithm for the estimations is reasonable. Considering the processing in the beam domain, some beams have higher signal quality than others. FIG. 1 illustrates a signal strength distribution received at a 32rx antennas on the element space, also referred to as element domain, Sorted beams after spatial transformation of the signal with use of Discrete Fourier Transform (DFT) basis also called DFT beam domain, and Sorted beams after spatial transformation with use of Singular Value Decomposition (SVD) basis also called SVD beam domain.

It can clearly be seen that the signal distribution is no-longer uniform. Thus, applying a single set of parameters and/or algorithm for all the beams is not optimal and can introduce some loss that undermines part of the beamforming gain. See e.g. in U.S. Pat. No. 8,249,509B2, depicting a wireless communications network, where it is focused on a selection of one single channel estimation scheme "one in plurality" for the whole signal depending on a computed channel information.

The received signals are beamformed or spatially transformed, which in many cases results in that the signal quality of the beams are not uniformly distributed. According to embodiments of a method herein, stronger beams and weaker beams use different algorithms and parameters and are treated with respect to their own signal quality. The obtaining of the signal quality is made separately for each beam, as well as the adapting of the channel estimation parameters and/or the channel estimation methods to the beam-specific signal quality, and the channel estimation action itself.

Adapting the method to the received beam-specific signal quality improves overall system quality. This is since in the context of beam based receivers, embodiments herein channel estimation is applied independently to each received beam/port of the overall received signal. Thus, optimizing the reception for each beam.

Having a more adaptive estimation for the beams individually allows overall better signal reception. Prior art fixed parameters among beams and/or elements are defined to make a decent tradeoff for a large band of SNR thus underperforming for beams in low and/or high SNR regions. Having a setting adapted among beams optimizes the reception and thus maximizes the quality for beams in low SNR region with increased coverage performance, and for beams in high SNR with increased cell capacity.

Figure 2:
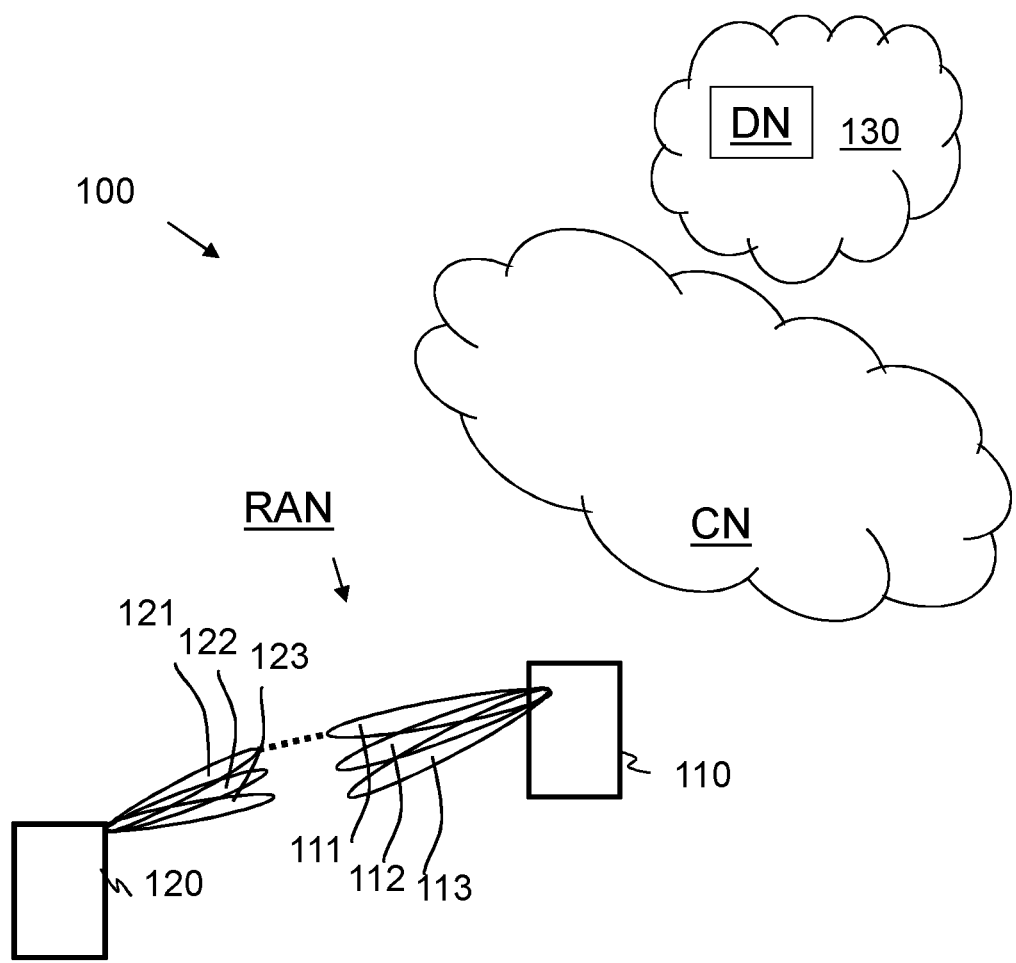
FIG. 2 is a schematic block diagram illustrating embodiments of a wireless communications network.

FIG. 2 is a schematic overview depicting a wireless communications network 100 wherein embodiments herein may be implemented. The wireless communications network 100 comprises one or more RANs and one or more CNs. The wireless communications network 100 may use 5G NR and beyond but may further use a number of other different technologies, such as, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a first radio node 110 or a plural of first radio nodes and a second radio node 120 or a plural of second radio nodes, providing radio coverage by means of antenna beams, referred to as beams herein.

The a first radio node 110 comprises multiple beams such as e.g. a first beam, 111, a second beam 112, and a third beam 113 and may use these beams for communicating with e.g. the second radio node 120.

The second radio node 120 may also comprises multiple beams such as e.g. a first beam, 121, a second beam 122, and a third beam 123 and may use these beams for communicating with e.g. the first radio node 110.

The first radio node 110 may e.g. be one or more base stations and the second radio node may be one or more UEs, or the other way around, the first radio node 110 may e.g. be one or more UEs and the second radio node may be one or more base stations. This is since there may be communication scenarios like MU-MIMO and or Multi-cell communication (CoMP).

In some further embodiments, the first radio node 110 may e.g. be a UE and the second radio node may be a UE communicating in side link.

The first radio node 110 may e.g. be a wireless communication node and the second radio node may be another wireless communication node, e.g. in scenarios of wireless routing, mini links and moving networks.

In some further embodiments, the first radio node 110 may e.g. be a wireless communication node and the second radio node may be another wireless communication node.

In case being a base station, the first/second radio node 110/120 provides radio coverage over a geographical area by means of antenna beams. The geographical area may be referred to as a cell, a service area, beam or a group of beams. The first/second radio node 110/120 may in this case be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell 11 served by first/second radio node 110/120 depending e.g. on the radio access technology and terminology used.

In case being a UE, the first/second radio node 110/120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). For side links, the UE communicates with another UE. In that case the "intermediate" UE serves as coverage extension of the wireless network. It should be understood by the skilled in the art that the second radio node relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

The methods according to embodiments herein are performed by the first radio node 110 which e.g. may be any one out of a network node and a UE.

As an alternative, a Distributed Node DN and functionality, e.g. comprised in a cloud 130 as shown in FIG. 2 may be used for performing or partly performing the methods.

Figure 3:
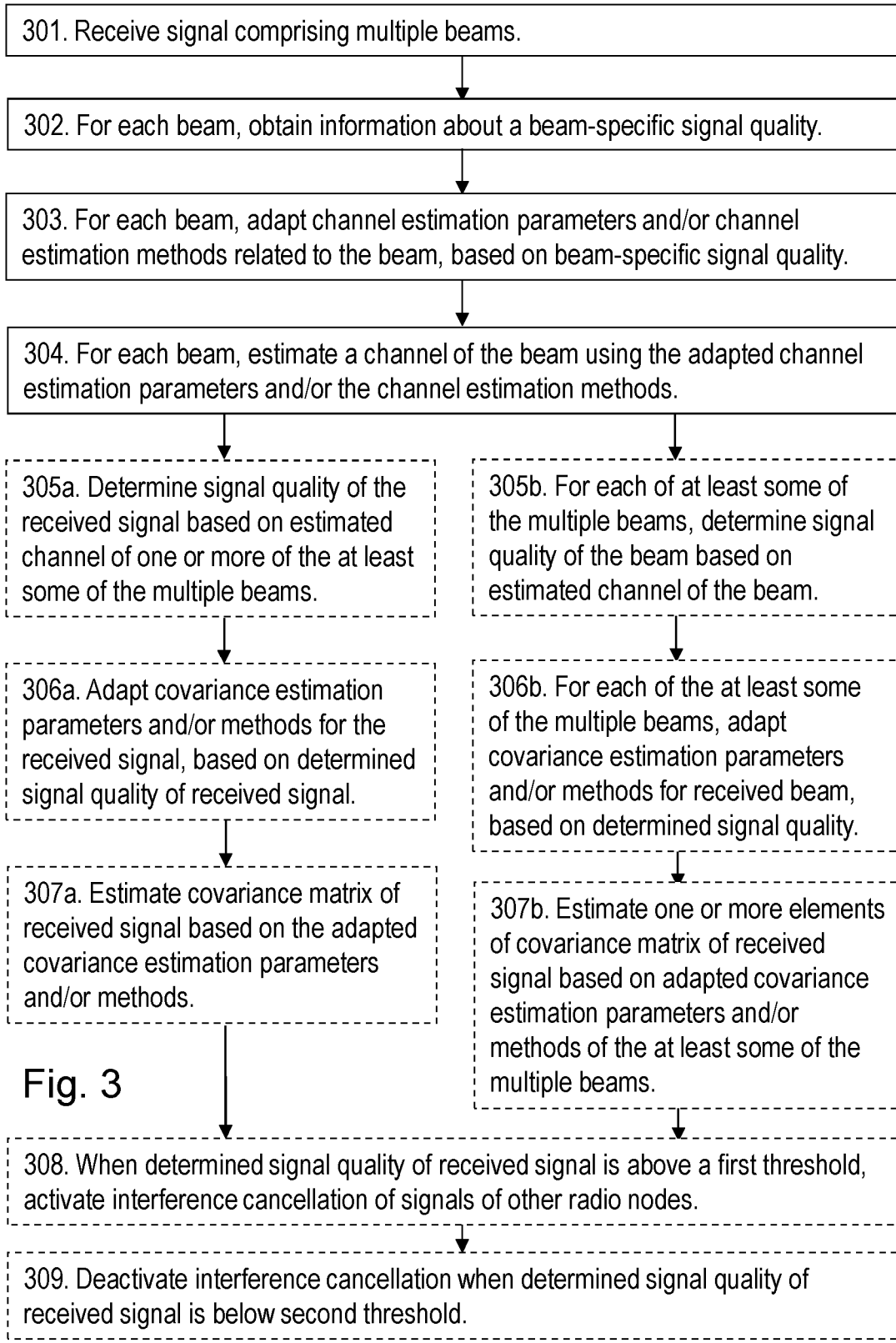
FIG. 3 is a flowchart depicting embodiments of a method in a radio node.

Example embodiments of a method performed by a first radio node 110 for estimating channels in a wireless communication network 100 will now be described with reference to a flowchart depicted in FIG. 3.

The method comprises the following actions, which actions may be taken in any suitable order. Actions that are optional are presented in dashed boxes in FIG. 3.

Action 301

The first radio node 110 receives a signal from the second radio node 120 in the wireless communication network 100. The signal comprises multiple beams. The word beam when used herein means a signal received from an antenna element; or a signal obtained through the combination of antenna elements. It may further mean means a signal received from a beam which is spatially transformed from one or plural of antenna elements. The signal may be not-spatially transformed, e.g. a basic case, or maybe not actively transformed in the sense that the antenna provides the beam gain directly such as analogue beams, non-isotropic antenna, or precombined sub-arrays.

The signal quality of the different beams may not be uniformly distributed. And thus, applying the same methods algorithms or parameters for all the beams is not preferred by embodiments herein. Instead, in the embodiments herein, different beams of the signal use different algorithms and parameters, e.g. stronger beams and weaker beams uses different algorithms and parameters. A typical quality difference within beams of a received signal may be in the order of the max gain of the beam transformation, e.g. for a 64 antenna elements.

Therefore, the method actions 302-304 below are performed for each of at least some of the multiple beams.

Action 302

To be able to adapt e.g. the channel estimation parameters into line with the respective beam, the first radio node 110 needs to know the signal quality of the respective beam of all the beams that shall be channel estimated, i.e. at least some of the multiple beams of the received signal. Thus, for each of at least some of the multiple beams, the first radio node 110 obtains information about a beam-specific signal quality. The wording beam-specific when used herein means something that is specific for the particular beam or possibly multiple beams.

The information about the beam-specific signal quality may be obtained by measuring the received beam. This may be performed by measuring the signal power of the specific beam compared to a known or measured and/or estimated noise power As an alternative and/or a complement, embodiments, the information about the beam-specific signal quality is obtained based on any one out of: Information obtained during a transformation phase of the received signal between the antenna and the estimator such as e.g. spatial transformation data, and scheduling information, such as e.g. Modulation and Coding Scheme (e.g. MCS indices, number of layers).

When doing the spatial transform, it may also possible to order the beams based on the strength of them. In that case, the strength is measured in the spatial transformation phase, so the information can be shared, but in the end it similar to the previous measurement, just in another place. If the spatial transform is SVD, eigenvalues may be obtained, that may be used as quality indicators. The order of the beams may also indicate which are the strongest and weakest beams, although this is a relative information.

Since the scheduling information is based on received signal quality, a possible way to use these information is to revert the mapping that is done in the scheduling/transport format selection. E.g. if a scheduled MCS index is high, it means that the expected signal quality and necessary to decode the data is high; if the scheduled index is low, the expected signal quality is low. Thus, using the scheduling information to estimate a received signal quality.

Although such information is not a guarantee of the effective signal quality, it indicates the intended signal quality. In case the MCS and signal quality are not matching each other, e.g. due to unexcepted change of signal quality, having this adaptive selection is not likely to affect negatively the overall performance. A summarized Table 1 shows the different conditions is shown here for understanding.

TABLE 1

|  | Actual SNR is high | Actual SNR is low |
| --- | --- | --- |
| MCS and expected SNR are high | Parameters optimized, improved performance. | Parameters not optimized, but the signal is likely to be not decodable even with optimized settings due to low quality compared to MCS requirements. |

TABLE 1-continued

|  | Actual SNR is high | Actual SNR is low |
| --- | --- | --- |
| MCS and expected SNR are low | Parameters not optimized, but signal is better than expected so success likelihood is high even with non-optimized settings | Parameters optimized, improved performance |

Action 303

When information about the beam-specific quality is obtained, the channel estimation parameters and/or channel estimation methods shall be adapted accordingly.

For each of the at least some of the multiple beams, the first radio node 110 then adapts any one or more out of: channel estimation parameters and channel estimation methods related to the beam, based on the beam-specific signal quality. In this way, the signal quality is associated with the settings, such as the channel estimation parameters and channel estimation methods, to be used in the estimating of the channel in next action.

Other possible steps such as interpolation, multi-antenna averaging etc. may be included for parameters and algorithm adaptations.

Thus it is also possible to reuse measurements or processed information obtained during the beam transformation phase, for instance, if the transformation uses methods like SVD, the eigenvalues may be used to estimate the difference of signal strength between the different beams.

Using indirect information such as scheduling information, e.g. to avoid live measurements of the signal, is also possible but require applying some offsets between the beams to account for the non-uniform distribution, the scheduling only give a global information. Such offsets may be predefined based on the beam space transformation properties, e.g. SVD has a strong beam concentration with a few very strong beams, while DFT has more medium beams, or based on historical data stored.

Some embodiments herein provide a way of mapping the signal quality to the filter length of an estimation algorithm.

The signal quality is required to set the right filter length to be used as noise mitigating algorithm of the beam.

For the channel estimation algorithm a filter may be used as noise mitigating algorithm, that takes as input the shape and size of the filter, e.g. Finite Impulse Response (FIR) filter, or mid-band filter. Here the beam-specific quality may be obtained by knowing that the higher the beam quality is, the less filtering is needed for optimal performance. So less filtering means higher quality of the beam. Typically, for very low SNR range of values, it may be beneficial to use a filter of size up to 10, while high SNR region may use a filter of small size, e.g. 2 or even 1. So a filter size of about 1 means high SNR of the beam and a filter size of 10 means low SNR and low quality of the beam.

Another way to do channel estimation is to perform a time-domain tap selection, that finds the parts of the signals corresponding to time-domain arrivals e.g. multi-tap channels of the beams. The information about a beam-specific signal quality may be applied to the threshold setting in the time-domain tap selection algorithm.

This selection is clearer in the high SNR region as the taps are standing out of the noise. In a noisy environment, it is hard to find out which tap is a noise or which is a signal. Thus, this technique can be activated w.r.t a signal quality threshold.

The time-domain tap selection is set based on beam quality.

Action 304

The channel estimation is the process to characterize the propagation channel of the signal between the transmitter and the receiver. When the channel estimation parameters and/or channel estimation methods are adjusted for the beamformed signal, the first radio node 110 performs channel estimation for the beam. This channel estimation is performed to be able to compensate the effect of the propagation and, e.g. in MIMO systems, be able to combine coherently the signals to recover the originally transmitted data. Thus, for each of the at least some of the multiple beams, the first radio node 110 estimates a channel, such as e.g. channel coefficients, of the beam using any one or more out of the adapted channel estimation parameters and the channel estimation methods. In this way, the different beams are treated with respect to their own signal quality. This is an advantage since each beam will then have a better channel estimation and so a better chance to decode the original data correctly.

Some subsequent actions below, relate to covariance estimations. In some embodiments wherein covariance matrix will be estimated, Actions 305a-307a are performed, and in some alternative embodiments wherein one or more elements of a covariance matrix is estimated, actions 305b-307b are performed.

Action 305a

In some embodiments a covariance matrix will be estimated based on the received signals and the channel estimates of many beams. In these embodiments the first radio node 110 determines a signal quality of the received signal based on the estimated channel, such as e.g. channel coefficients, of one or more of the at least some of the multiple beams. This may be performed by comparing the channel estimates values with a preset or estimated noise value, or comparing the channel estimates of the beams for different layers.

Action 306a

In these embodiments, the first radio node 110 adapts any one or more out of covariance estimation parameters and covariance estimation methods, for the received signal, based on the determined signal quality of the received signal. This may be performed by enabling an interference suppression method if the quality is higher than a given threshold; or disabling the interference suppression method if the quality is below. This may be performed by setting the size of a moving averaging window over the frequency and/or time domain, wherein a high quality signal would map to a smaller window size.

Action 307a

In these embodiments, the first radio node 110 then estimates a covariance matrix of the received signal based on any one or more out of: The adapted covariance estimation parameters and the adapted covariance estimation methods. This may be performed by calculating a raw covariance on the received signals and/or beams; then some refinements may be applied to improve accuracy, such as applying a moving average window, as mentioned in 306a. If there are multiple layers, the channel estimates of the other layers may be used to subtract that interfering signal from the covariance.

Action 305b

In some alternative embodiments one or more elements of a covariance matrix are estimated for some of the beams. For each of at least some of the multiple beams the first radio node 110 determines a signal quality of the beam based on the estimated channel, e.g. channel coefficients, of the beam. This may be performed comparing the channel estimates value of the beam with a preset or estimated noise value, or comparing the channel estimates of the beam with that of other beams or of other layers.

Action 306b

In these alternative embodiments, for each of the at least some of the multiple beams, the first radio node 110 further adapts any one or more out of: covariance estimation parameters and covariance estimation methods, for the received beam, based on the determined signal quality of the received signal This may be performed by enabling an interference suppression method if the quality is higher than a given threshold; or disabling the interference suppression method if the quality is below. This may be performed by setting the size of a moving averaging window over the frequency and/or time domain, wherein a high quality signal would map to a smaller window size.

Action 307b

In these alternative embodiments, the first radio node 110 then estimates one or more elements of a covariance matrix of the received signal based on any one or more out of: the adapted covariance estimation parameters and covariance estimation methods, of said at least some of the multiple beams. This may be performed by calculating a raw covariance on the received signals and/or beams; then some refinements may be applied to improve accuracy, such as applying a moving average window, as mentioned in 306a. If there are multiple layers, the channel estimates of the other layers may be used to subtract that interfering signal from the covariance. The one or more elements are related to the each respective beam of the at least some of the multiple beams.

Action 308

As another example, the covariance and channel estimations actions may comprise interference cancellation, such as an interference cancellation algorithm, i.e. removing signals of known other-sources such as other radio nodes from the signal for further processing. This may be benefit from, when the SNR of the signals is high enough, this applies to the signal to be cancelled, as if the signal cancelled is not well known, the cancellation may result to worse signal than the original. A threshold on signal quality may be set to activate or deactivate such feature. Thresholds or mapping values may be predetermined by system design. In some embodiments, Successive Interference Cancellation (SIC) may be used in it is tried to demodulate and/or decode the strongest user(s) and recreate-and-subtract them from the input signal, then demodulate and decode the weaker users. In some other embodiments, e.g. for cases where different users have similar SINR, it may be an advantage to use Parallel Interference Cancellation (PIC).

Hence, when the determined signal quality of the received signal is above a first threshold, the first radio node 110 may activate interference cancellation of signals of other radio nodes comprised in the received signal. After the interference cancellation, the first radio node 110 may again perform any one or more estimations out of: the channel of the beam, see Action 304 above, a covariance matrix, see Action 307a above, and the one or more elements of a covariance matrix see Action 307a above.

Action 309

The first radio node 110 may then deactivate the interference cancellation when the determined signal quality of the received signal is below a second threshold.

This may be performed by removing from the input signal the signal that corresponds to the decoded data of an already decoded layer.

Embodiments herein such as mentioned above will now be further described and exemplified. The text below is applicable to and may be combined with any suitable embodiment described above.

It should be noted that depending on the implementation, the settings for different estimation steps may be adjusted in a sequential manner, not all at once, e.g. the parameters for the covariance estimation action may be decided after the channel estimation is completed, so that some refined information are available.

It should further be noted that the measurement of the signal quality for different actions may be based on different original data, e.g. raw signal, channel estimates, scheduling information . . . and using different metrics when appropriate, e.g. the channel estimation may use the MCS information as a direct metric, while the covariance estimation can use the orthogonality of the channel estimates between users.

Covariance is related to the joint statistics of two variables, e.g. X and Y. If two received beams are considered, a covariance value may be computed for any pair of beams. In signal processing and specifically in a receiver and/or combiner of a radio node, an important processing information is the Covariance matrix, which is the matrix of the covariance of all pairs of beams. Hence, if N input signals or beams are processed, it results in an N*N covariance matrix. This matrix may typically be used for noise and/or interference rejection of the received signal e.g. in MMSE.

According to some embodiments herein, the covariance matrix as a whole is estimated based on some specifically adapted parameters, based on signal quality of the beams.

According to some embodiments herein, some specific covariance elements of that matrix may be estimated, based on the specific parameters, based on the qualities of a specific pair of beams. Any pair of two beams, including a beam with itself, i.e. the variance, that is on the diagonal of the covariance matrix.

Figure 4:
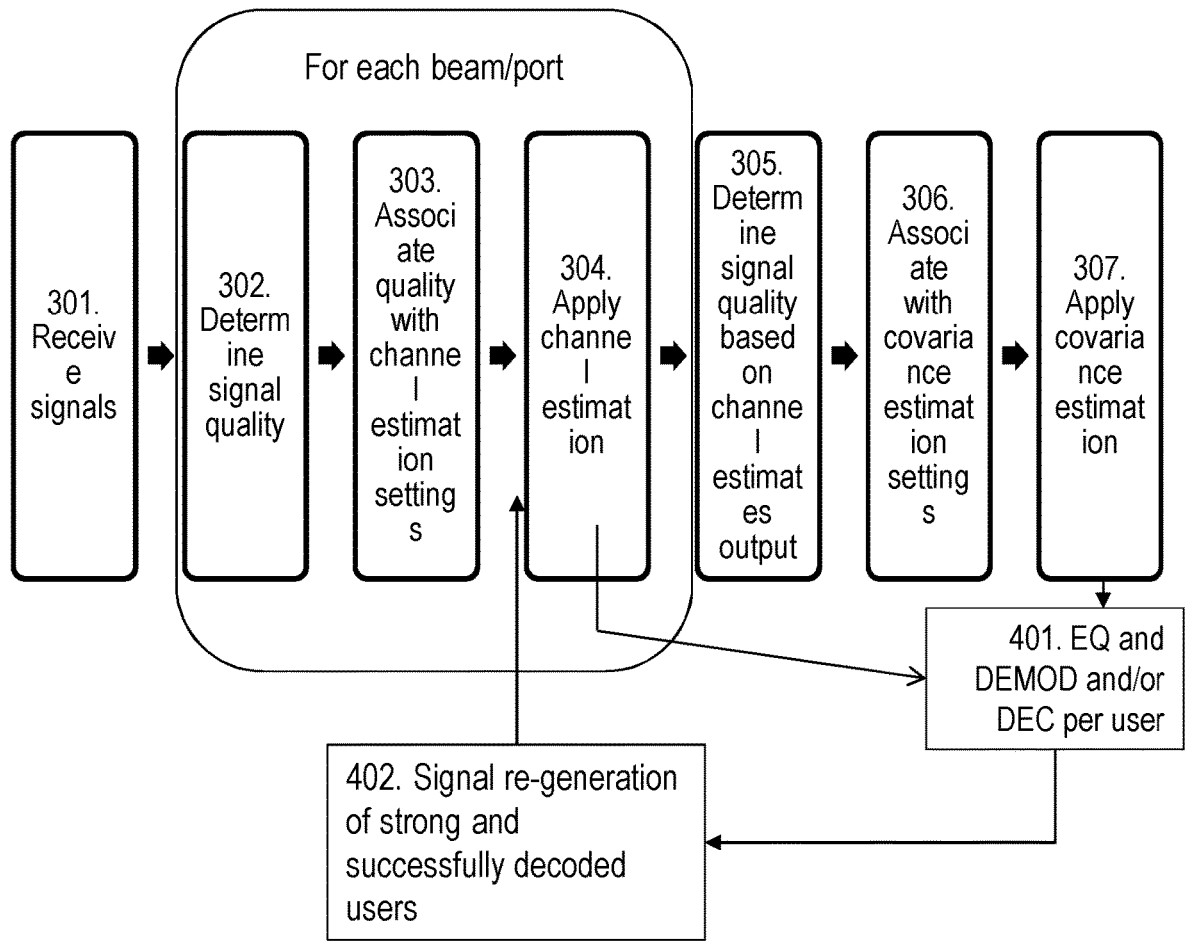
FIG. 4 is a schematic block diagram illustrating embodiments herein.

As another example, the covariance and channel estimations actions may comprise interference cancellation, such as an interference cancellation algorithm, i.e. removing signals of known other-sources such as other radio nodes from the signal for further processing. An example is illustrated in FIG. 4. The boxes show the process actions 301-307 as described above the blue blocks according to embodiments herein.

Additionally/alternatively, a further action may be to see if all users such as UEs, are successfully decoded, the output from the box 401 EQ/DEMOD/DEC. Wherein EQ=equalization. DEMOD=demodulation. DEC=decoding. EQ and DEMOD and/or DEC are performed per user. If some are and some are not, the successfully decoded users may be canceled, channel and covariance estimations and the EQ/DEMOD/DEC for those weaker users may be redone, see box 402. To cancel those successfully decoded users, the signals for those users need to re-generated.

Yet another alternative is to just check the demodulated signals, without involving decoding, of different users, and use a threshold to decide strong and weak users, and do re-generation of the strong users and cancelling from the total signal, then EQ/DEMOD the weaker users.

Signal re-generation of strong and successfully decoded users may be activated and/or deactivate in three different stages:

In one example, after the beam-specific channel estimations, and see if some users are too weak at the same time as some users are very strong, e.g. by means of a threshold. In this example, the strong users may be canceled.

In another example after demodulation similar to the above example and see if some users are too weak at the same time as some users are very strong though with another threshold. To do demodulation both channel estimation and covariance estimation are needed.

In another example, after decoding some users and found out that some users are not decoded correctly, e.g. after Cyclic Redundancy Check (CRC) check. No threshold is needed here. The decoding is performed after demodulation.

Figure 5A:
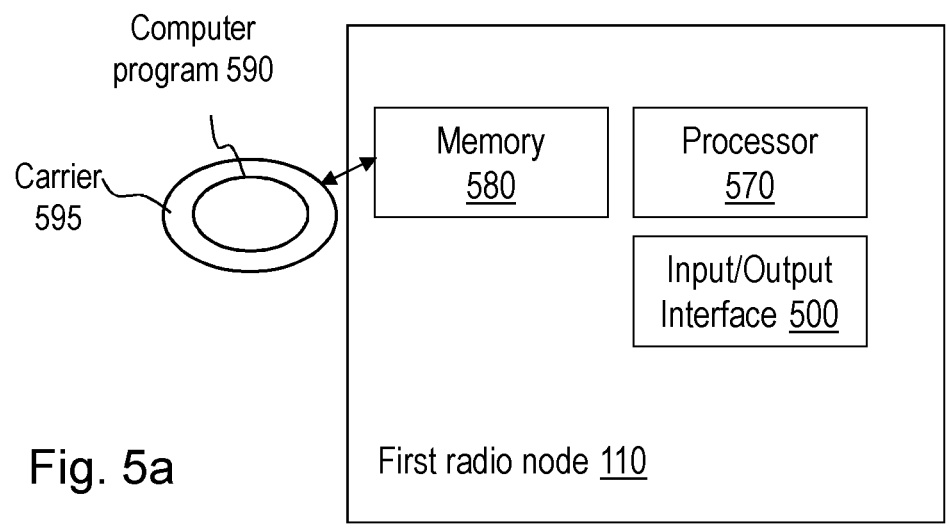
FIGS. 5a and b are schematic block diagrams illustrating embodiments of a radio node.
Figure 5B:
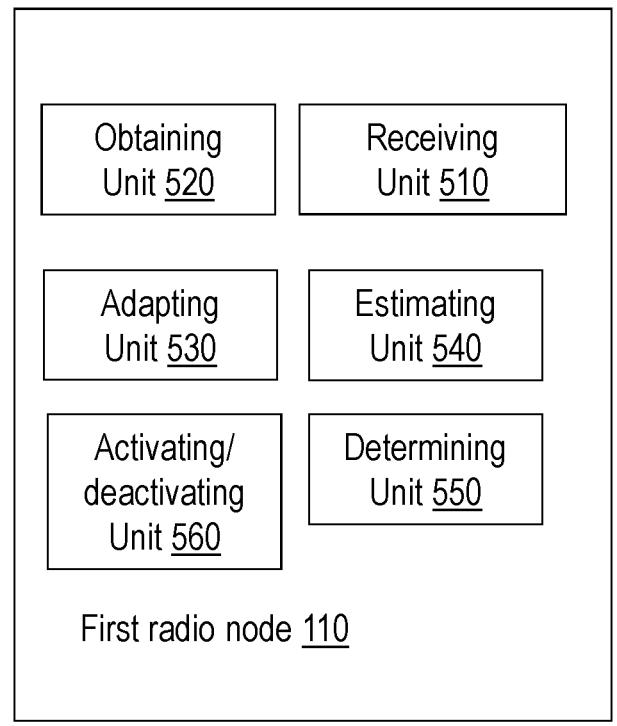

To perform the method actions above for estimating channels in a wireless communication network, the first radio node 110 may comprise the arrangement depicted in FIGS. 5a and 5b.

The first radio node 110 may comprise an input and output interface 500 configured to communicate e.g. with the second radio node 120. The input and output interface 500 may comprise a wireless receiver (not shown) and a wireless transmitter (not shown).

The first radio node 110 is configured to, e.g. by means of a receiving unit 510 in the first radio node 110, receive a signal from a second radio node 120 in the wireless communication network 100. The signal is adapted to comprise multiple beams.

The first radio node 110 is configured to, for each of at least some of the multiple beams, obtain, e.g. by means of an obtaining unit 520 in the first radio node 110, information about a beam-specific signal quality.

In some embodiments, the information about the beam-specific signal quality is to be obtained by measuring the received beam.

In some alternative embodiments, the information about the beam-specific signal quality is to be obtained based on any one out of:

Information obtained during a transformation phase of the received signal between the antenna and the estimator, and scheduling information.

The first radio node 110 is further configured to, for each of at least some of the multiple beams, adapt, e.g. by means of an adapting unit 530 in the first radio node 110, any one or more out of: channel estimation parameters and channel estimation methods, related to the beam, based on the beam-specific signal quality.

The first radio node 110 may further be configured to, adapt, e.g. by means of the adapting unit 530 in the first radio node 110, any one or more out of covariance estimation parameters and covariance estimation methods for the received signal, based on the determined signal quality of the received signal.

The first radio node 110 may further be configured to, for each of at least some of the multiple beams, adapt, e.g. by means of the adapting unit 530 in the first radio node 110, any one or more out of: covariance estimation parameters and covariance estimation methods, for the received beam, based on the determined signal quality of the received signal.

The first radio node 110 is further configured to, for each of at least some of the multiple beams, estimate e.g. by means of an estimating unit 540 in the first radio node 110, a channel of the beam using any one or more out of: the adapted channel estimation parameters and the channel estimation methods.

The first radio node 110 may further be configured to, estimate e.g. by means of the estimating unit 540 in the first radio node 110, a covariance matrix of the received signal based on any one or more out of the adapted covariance estimation parameters and the adapted covariance estimation methods.

The first radio node 110 is further configured to estimate, e.g. by means of the estimating unit 540 in the first radio node 110, one or more elements of a covariance matrix of the received signal based on any one or more out of: the adapted covariance estimation parameters and covariance estimation methods, of said at least some of the multiple beams.

The first radio node 110 may further be configured to, e.g. by means of an determining unit 550 in the first radio node 110, determine a signal quality of the received signal based on the estimated channel of one or more of the at least some of the multiple beams.

The first radio node 110 may further be configured to, for each of at least some of the multiple beams, determine, e.g. by means of the determining unit 550 in the first radio node 110, a signal quality of the beam based on the estimated channel e.g. coefficients of the beam.

In some embodiments, the first radio node 110 is further configured to, when the determined signal quality of the received signal is above a first threshold, activate, e.g. by means of an activating/deactivating unit 560 in the first radio node 110, interference cancellation of signals of other radio nodes comprised in the received signal, and after the interference cancellation, again perform any one or more estimations out of: the channel of the beam, a covariance matrix, and the one or more elements of a covariance matrix.

In some of these embodiments, the first radio node 110 is further configured to, deactivate, e.g. by means of an activating/deactivating unit 560 in the first radio node 110, the interference cancellation when the determined signal quality of the received signal is below a second threshold.

The embodiments herein may be implemented through a respective processor or one or more processors, such as a processor 570 of a processing circuitry in the first radio node 110 depicted in FIG. 5b, together with a respective computer program code for performing the functions and actions of the embodiments herein. The program code mentioned above may also be provided as a computer program product, for instance in the form of a data carrier carrying computer program code for performing the embodiments herein when being loaded into the first radio node 110. One such carrier may be in the form of a CD ROM disc. It is however feasible with other data carriers such as a memory stick. The computer program code may furthermore be provided as pure program code on a server and downloaded to the first radio node 110.

The first radio node 110 may further comprise a memory 580 comprising one or more memory units. The memory comprises instructions executable by the processor 570. The memory 580 is arranged to be used to store e.g. information about the beam-specific signal quality, channel estimation parameters and channel estimation methods, adapted channel estimation parameters and the channel estimation methods, covariance estimation parameters and covariance estimation methods for the received signal, adapted covariance estimation parameters and adapted covariance estimation methods, a covariance matrix, one or more elements of a covariance matrix, and the first and second threshold, and applications to perform the methods herein when being executed in the first radio node 110.

Those skilled in the art will also appreciate that the units in the first radio node 110 mentioned above may refer to a combination of analog and digital circuits, and/or one or more processors configured with software and/or firmware, e.g. stored in the first radio node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 590 comprises instructions, which when executed by the respective at least one processor 570, cause the at least one processor 570 of the first radio node 110 to perform the actions above.

In some embodiments, a carrier 595 comprises the computer program 590, wherein the carrier 595 is one of an electronic signal, an optical signal, an electromagnetic signal, a magnetic signal, an electric signal, a radio signal, a microwave signal, or a computer-readable storage medium.

Further Extensions and Variations

Figure 6:
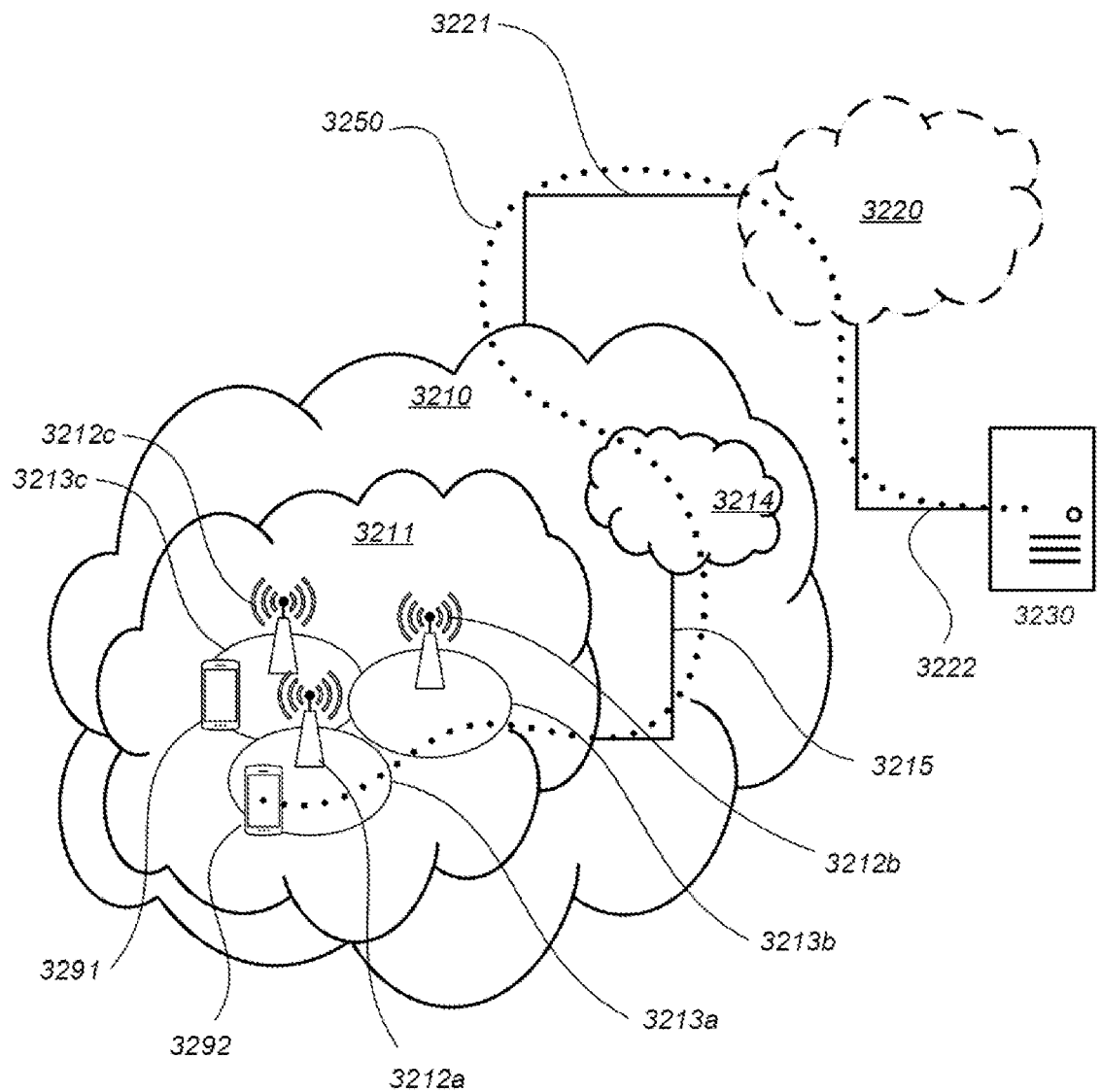
FIG. 6 schematically illustrates a telecommunication network connected via an intermediate network to a host computer.

With reference to FIG. 6, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the first or second radio node 110, 120, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
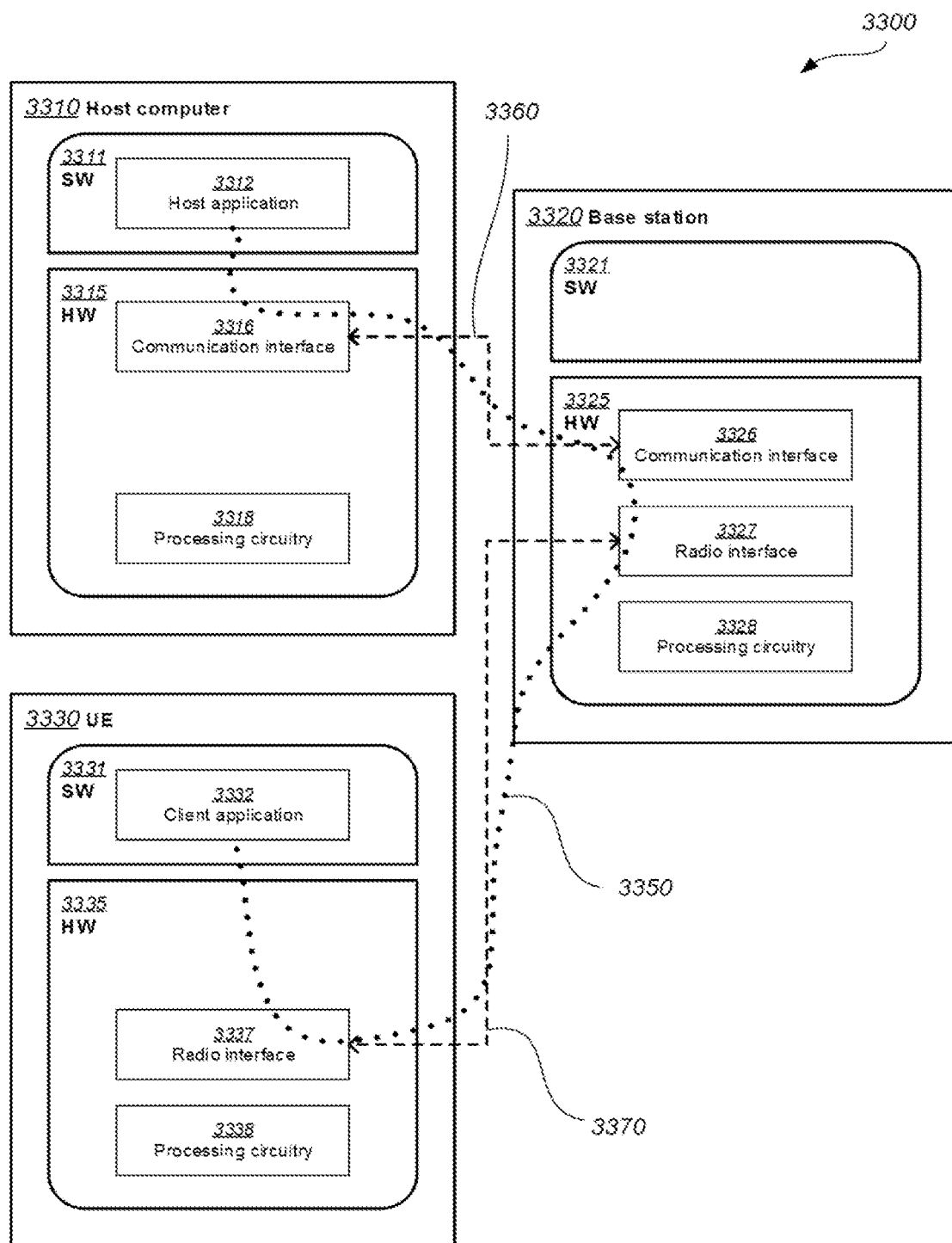
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 8 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 9 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a first radio node for estimating channels in a wireless communication network, the method comprising:
 receiving a signal from a second radio node in the wireless communication network, which signal comprises multiple beams;
 for each of at least two of the multiple beams:
  obtaining information about a beam-specific signal quality;
  adapting any one or more out of: channel estimation parameters and channel estimation methods related to the beam, based on the beam-specific signal quality; and
  estimating a channel of the beam using any one or more out of: the adapted channel estimation parameters and the channel estimation methods;
 determining a signal quality of the received signal based on the estimated channel of one or more of the at least two of the multiple beams;
 adapting any one or more out of covariance estimation parameters and covariance estimation methods, for the received signal, based on the determined signal quality of the received signal; and
 estimating a covariance matrix of the received signal based on any one or more out of the adapted covariance estimation parameters and the adapted covariance estimation methods.

2. The method according to claim 1, further comprising:
 for each of at least two of the multiple beams determining a signal quality of the beam based on the estimated channel of the beam;
 for each of the at least two of the multiple beams adapting any one or more out of: covariance estimation parameters and covariance estimation methods, for the received beam, based on the determined signal quality of the received signal; and
 estimating one or more elements of a covariance matrix of the received signal based on any one or more out of: the adapted covariance estimation parameters and covariance estimation methods, of said at least some of the multiple beams.

3. The method according to claim 1, further comprising:
when the determined signal quality of the received signal is above a first threshold, activating interference cancellation of signals of other radio nodes comprised in the received signal; and
after the interference cancellation, again performing any one or more estimations out of: the channel of the beam, a covariance matrix, and the one or more elements of a covariance matrix.

4. The method according to claim 3, further comprising:
deactivating the interference cancellation when the determined signal quality of the received signal is below a second threshold.

5. The method according to claim 1, wherein the information about the beam-specific signal quality is obtained by measuring the received beam.

6. The method according to claim 1, wherein the information about the beam-specific signal quality is obtained based on any one out of:
information obtained during a transformation phase of the received signal between the antenna and the estimator; and
scheduling information.

7. The method according to claim 1, further comprising:
when the determined signal quality of the received signal is above a first threshold, activating interference cancellation of signals of other radio nodes comprised in the received signal; and
after the interference cancellation, again performing any one or more estimations out of: the channel of the beam, a covariance matrix, and the one or more elements of a covariance matrix.

8. The method according to claim 2, further comprising:
when the determined signal quality of the received signal is above a first threshold, activating interference cancellation of signals of other radio nodes comprised in the received signal; and
after the interference cancellation, again performing any one or more estimations out of: the channel of the beam, a covariance matrix, and the one or more elements of a covariance matrix.

9. The method according to claim 7, further comprising:
deactivating the interference cancellation when the determined signal quality of the received signal is below a second threshold.

10. The method according to claim 1, wherein the information about the beam-specific signal quality is obtained by measuring the received beam.

11. The method according to claim 1, wherein the information about the beam-specific signal quality is obtained based on any one out of:
information obtained during a transformation phase of the received signal between the antenna and the estimator; and
scheduling information.

12. A non-transitory computer storage medium storing a computer program comprising instructions, which when executed by a processor, cause the processor to perform a method for estimating channels in a wireless communication network, the method comprising:
receiving a signal from a second radio node in the wireless communication network, which signal comprises multiple beams;
for each of at least two of the multiple beams:
obtaining information about a beam-specific signal quality;
adapting any one or more out of: channel estimation parameters and channel estimation methods related to the beam, based on the beam-specific signal quality; and
estimating a channel of the beam using any one or more out of: the adapted channel estimation parameters and the channel estimation methods;
determining a signal quality of the received signal based on the estimated channel of one or more of the at least two of the multiple beams;
adapting any one or more out of covariance estimation parameters and covariance estimation methods, for the received signal, based on the determined signal quality of the received signal; and
estimating a covariance matrix of the received signal based on any one or more out of the adapted covariance estimation parameters and the adapted covariance estimation methods.

13. A first radio node for estimating channels in a wireless communication network, the first radio node being configured to:
receive a signal from a second radio node in the wireless communication network, which signal comprises multiple beams;
for each of at least two of the multiple beams:
obtain information about a beam-specific signal quality;
adapt any one or more out of: channel estimation parameters and channel estimation methods, related to the beam, based on the beam-specific signal quality; and
estimate a channel of the beam using any one or more out of: the adapted channel estimation parameters and the channel estimation methods;
determine a signal quality of the received signal based on the estimated channel of one or more of the at least two of the multiple beams;
adapt any one or more out of covariance estimation parameters and covariance estimation methods for the received signal, based on the determined signal quality of the received signal; and
estimate a covariance matrix of the received signal based on any one or more out of the adapted covariance estimation parameters and the adapted covariance estimation methods.

14. The first radio node according to claim 13, being further configured to:
for each of at least two of the multiple beams determine a signal quality of the beam based on the estimated channel of the beam;
for each of the at least two of the multiple beams adapt any one or more out of: covariance estimation parameters and covariance estimation methods, for the received beam, based on the determined signal quality of the received signal; and
estimate one or more elements of a covariance matrix of the received signal based on any one or more out of: the adapted covariance estimation parameters and covariance estimation methods, of said at least some of the multiple beams.

15. The first radio node according to claim 13, being further configured to:
when the determined signal quality of the received signal is above a first threshold, activate interference cancellation of signals of other radio nodes comprised in the received signal; and after the interference cancellation, again perform any one or more estimations out of: the channel of the beam, a covariance matrix, and the one or more elements of a covariance matrix.

16. The first radio node according to claim 15, being further configured to:
deactivate the interference cancellation when the determined signal quality of the received signal is below a second threshold.

17. The first radio node according to claim 13, wherein the information about the beam-specific signal quality is obtained by measuring the received beam.

18. The first radio node according to claim 13, wherein the information about the beam-specific signal quality is obtained based on any one out of:
information obtained during a transformation phase of the received signal between the antenna and the estimator; and
scheduling information.

* * * * *